US011283081B2

(12) United States Patent
Behrendt

(10) Patent No.: US 11,283,081 B2
(45) Date of Patent: Mar. 22, 2022

(54) GAS DIFFUSION ELECTRODE AND FUEL CELL COMPRISING SUCH A GAS DIFFUSION ELECTRODE

(71) Applicants: VOLKSWAGEN AG, Wolfsburg (DE); AUDI AG, Ingolstadt (DE)

(72) Inventor: Reiner Nico Behrendt, Wolfsburg (DE)

(73) Assignee: AUDI AG, Ingolstadt (DE)

(*) Notice: Subject to any disclaimer, the term of this patent is extended or adjusted under 35 U.S.C. 154(b) by 473 days.

(21) Appl. No.: 16/330,716

(22) PCT Filed: Sep. 4, 2017

(86) PCT No.: PCT/EP2017/072124
§ 371 (c)(1),
(2) Date: Mar. 5, 2019

(87) PCT Pub. No.: WO2018/046446
PCT Pub. Date: Mar. 15, 2018

(65) Prior Publication Data
US 2021/0313590 A1 Oct. 7, 2021

(30) Foreign Application Priority Data
Sep. 6, 2016 (DE) ............ 10 2016 116 632.4

(51) Int. Cl.
*H01M 4/88* (2006.01)
*H01M 4/86* (2006.01)
(Continued)

(52) U.S. Cl.
CPC ....... *H01M 4/8807* (2013.01); *H01M 4/8605* (2013.01); *H01M 4/928* (2013.01);
(Continued)

(58) Field of Classification Search
CPC .. H01M 4/8807; H01M 4/8605; H01M 4/928; H01M 8/1023; H01M 2008/1095; H01M 2250/20; H01M 2300/0082
See application file for complete search history.

(56) References Cited

U.S. PATENT DOCUMENTS 8,535,847 B2   9/2013  Tanuma
8,546,042 B2  10/2013  Ugawa et al.
(Continued)

FOREIGN PATENT DOCUMENTS

DE    11 2012 001 597 T5   2/2014
DE    10 2013 219 010 A1   3/2015
(Continued)

OTHER PUBLICATIONS

Machine Translation DE 102013219010A1 (Year: 2015).*

*Primary Examiner* — Victoria H Lynch
(74) *Attorney, Agent, or Firm* — Seed IP Law Group LLP

(57) ABSTRACT

A gas diffusion electrode for a fuel cell which comprises a gas-permeable substrate that has functional groups is provided, said groups being capable of complexing cations, and catalytically active noble metal particles and/or atoms, said particles and/or atoms being bonded by the functional groups to a surface of a first flat side of the substrate and/or in a surface-proximal region of a first flat side of the substrate. The gas diffusion electrode according to the invention combines the functions of a gas diffusion layer and a catalytic layer in an integral component and is distinguished by a high long-term stability with respect to degradation phenomena of the catalyst.

13 Claims, 2 Drawing Sheets

(51) Int. Cl.
 _H01M 4/92_   (2006.01)
 _H01M 8/1023_  (2016.01)
 *H01M 8/10*    (2016.01)

(52) U.S. Cl.
 CPC .. _H01M 8/1023_ (2013.01); *H01M 2008/1095* (2013.01); *H01M 2250/20* (2013.01); *H01M 2300/0082* (2013.01)

(56) References Cited

U.S. PATENT DOCUMENTS

| | | |
|---|---|---|
| 8,758,955 B2 | 6/2014 | Li et al. |
| 2007/0148520 A1 | 6/2007 | Shin et al. |
| 2012/0202134 A1 | 8/2012 | Badrinarayanan et al. |

FOREIGN PATENT DOCUMENTS

| | | |
|---|---|---|
| DE | 10 2015 224 835 A1 | 6/2017 |
| EP | 2 357 655 A1 | 8/2011 |
| JP | 2010-118269 A | 5/2010 |

\* cited by examiner

GAS DIFFUSION ELECTRODE AND FUEL CELL COMPRISING SUCH A GAS DIFFUSION ELECTRODE

BACKGROUND

Technical Field

The disclosure relates to a gas diffusion electrode for a fuel cell having a simplified structure. The disclosure further relates to a fuel cell comprising such a gas diffusion electrode, and to a fuel cell system comprising such a fuel cell.

Description of the Related Art

Fuel cells use the chemical conversion of a fuel with oxygen into water in order to generate electrical energy. For this purpose, fuel cells contain what is known as the membrane electrode assembly (MEA) as a core component, which assembly is a structure or a composite made up of an ion-conducting (usually proton-conducting) membrane and a catalytic electrode (anode and cathode) respectively arranged on both sides of the membrane. The latter mostly comprise a catalyst layer of supported noble metal particles, in particular platinum, and polymeric binders. Gas diffusion layers (GDL) are arranged on both sides of the electrode that face away from the membrane, wherein a microporous layer is often also arranged between GDL and catalyst layer, which microporous layer is intended to prevent the penetration of the catalyst particles into the GDL. Typical GDL are mostly formed from (expanded) graphites, carbon fibers, or hydrophilized polymeric materials. The catalyst layers may be applied directly onto both sides of the membrane; in this instance, they are referred to as catalytically coated membranes (CCM). Alternatively, the catalyst layer is applied on the GDL or the microporous layer, so that a gas diffusion electrode is present.

Generally, the fuel cell is formed by a plurality of MEAs arranged in the stack, the electrical power outputs of which add up. Bipolar plates (also called flow field plates or separator plates), which ensure a supply of the individual cells with the operating media, i.e., the reactants, and which are usually also used for cooling, are generally arranged between the individual membrane electrode assemblies. In addition, the bipolar plates also ensure an electrically conductive contact to the membrane electrode assemblies.

During operation of the fuel cell, the fuel (anode operating medium), particularly hydrogen $H_2$ or a gas mixture containing hydrogen, is supplied to the anode via an open flow field of the bipolar plate on the anode side, where electrochemical oxidation of $H_2$ to protons $H^+$ with loss of electrons takes place ($H_2 \rightarrow 2H^+ + 2e^-$). Protons are transported (water-bound or water-free) from the anode chamber into the cathode chamber across the electrolyte or membrane that separates and electrically insulates the reaction chambers gas tight from each other. The electrons provided at the anode are guided to the cathode via an electrical line. The cathode receives, as a cathode operating medium, oxygen or a gas mixture containing oxygen (such as air) via an open flow field of the bipolar plate on the cathode side, so that a reduction of $O_2$ to $O^{2-}$ with gain of electrons takes place ($\frac{1}{2}O_2 + 2e^- \rightarrow O^{2-}$). At the same time, the oxygen anions react in the cathode chamber with the protons transported across the membrane to form water ($O^{2-} + 2H^+ \rightarrow H_2O$).

For a high catalytic activity of the catalyst, its large accessible surface is decisive. However, catalyst layers of fuel cells are subject to aging processes. A phenomenon occurring within this scope is agglomeration, i.e., the coalescence of the finely distributed catalytic noble metal into coarser structures, leading to a decrease of the catalytically active surface. Furthermore, washout and loss of the noble metal occur. Catalyst layers are therefore sought in which the catalytic noble metal is bonded as stably as possible to the support in a fine distribution.

It is known to produce gas diffusion layers or the microporous layers from carbonized polyacrylonitrile (PAN) fibers (also called PAN-based carbon fibers or simply PAN carbon fibers), for example as described in EP 2 357 655 A1. These are fibers of polyacrylonitrile which have been subjected to a multistage process in order to convert the nitrile groups into nitrogen-containing aromatic heterocycles, and thus to provide the necessary electrical conductivity.

U.S. Pat. No. 8,535,847 B2 describes a fuel cell with a polymer electrolyte membrane, two catalytic layers applied thereupon, and two subsequent gas diffusion layers. A protective layer of PAN carbon fibers is applied onto each of the gas diffusion layers which face toward the catalytically coated membrane.

US 2012/0202134 A1 describes a fuel cell whose gas diffusion layers are comprised of PAN-based carbon fibers and have no microporous layer.

In order to confront the problem of the catalytic metal washing out, U.S. Pat. No. 8,546,042 B2, for example, describes integrating a complexing agent into the catalyst layer made of carbon-supported platinum.

BRIEF SUMMARY

Embodiments of the invention are based on proposing a gas diffusion electrode for fuel cells which is robust against agglomeration and washout of the catalytic noble metal and has a simple structure.

The gas diffusion electrode according to an embodiment of the invention for a fuel cell comprises:
- a gas-permeable substrate which is formed from an organic polymer which has functional groups capable of complexing metal cations, and
- catalytically active noble metal particles and/or atoms that are bonded, by means of the functional groups, to a surface of a first flat side of the substrate and/or in a surface-proximal region of the first flat side of the substrate.

The gas diffusion electrode according to such an embodiment of the invention thus has a very simple structure which is essentially formed by the gas-permeable substrate with complexing groups and catalytic noble metals bonded thereto. The gas diffusion electrode according to such an embodiment of the invention thus has no separate catalytic layer. Rather, the catalytically active metal particles or atoms are integrated directly into the gas diffusion layer. The gas diffusion electrode thus combines the functions of a gas diffusion layer (GDL) and a catalytic layer in a single integral component. A further difference relative to conventional gas diffusion electrodes or catalytic coatings of membranes is that the catalytic noble metal is present in the form of very fine metallic particles having an oxidation number of zero, or even as atomic particles. This is effected in that the noble metal as an ion is first bonded via a complex bonding (chelate fixation) to the functional groups of the polymer, and is converted to the oxidation state of zero via subsequent reduction. The product of the reduction is the elemental (uncharged) noble metal present in finely particulate and/or atomic form, it being assumed that the noble metal atoms or particles are still present in complex form or in complex-like form bound to the functional groups. This leads to a very fine distribution of the catalytic noble metal and an extremely large accessible catalytic surface. Also to be emphasized is the (original) chemical attachment of the noble metal via complex bonds by the corresponding functional groups of the substrate. Naturally, chemical bonds are substantially stronger and more stable than purely physical bonds, for example as they are present in conventional catalytic layers, where the noble metal is retained on carbon support particles by adhesion. The formation "in situ" of the noble metal from complex-bound noble metal cations thus prevents both the coalescence of the catalyst into coarser structures (agglomeration) and the washing out and discharge of the noble metal from the catalyst structure. The gas diffusion electrode is thus substantially more stable long-term against aging influences.

A complex bond, also termed a coordinative bond, is understood to mean a chemical bond type in which a central atom, which is typically a metal cation (here: the noble metal cation) and typically has "holes" in its electron configuration, is surrounded by one or more molecules or functional groups (the ligands) which bind the central atom by means of free electron pairs. In the context of embodiments of the present invention, the complexing groups, meaning the ligands, are represented by functional groups of the polymer from which the substrate is formed. The complexing functional groups are thereby covalently bonded to the organic polymer backbone, preferably in the form of side groups.

In the context of embodiments of the present invention, particularly preferred examples of complexing functional groups are amidoxime groups ($R-C(NH_2)=N-OH$), hydroxamic acid groups ($R-CO-NHOH$), amidrazone groups ($R-C(=NH)-NH-NH_2$ including tautomers $R-C(NH_2)=N-NH_2$ and $R-CH(NH_2)-N=NH$), and mixtures thereof. These are in each case what are known as bidentate ligands, which therefore have two free electron pairs which are suitable for complexing the metal cation. A comparatively stable bonding of the catalytic metal is thus already possible with a single one of these groups. However, it is more likely that the noble metal cation is present bonded coordinatively by two or in particular by three of these groups. Of the aforementioned groups, amidoxime groups are particularly advantageous. In addition to the aforementioned groups, however, within the scope of the present invention a range of further groups also come under consideration, which further groups are explained in more detail in the exemplary embodiments.

In embodiments of the invention, the gas-permeable substrate is formed from a polymer having nitrile groups, the nitrile groups of which are partly or entirely converted into amidoxime groups, hydroxamic acid groups, and/or amidrazone groups. A particularly preferred example of such a polymer is polyacrylonitrile (PAN) or a copolymer or blend thereof whose nitrile groups have been transformed with hydroxylamine ($NH_2OH$) and/or hydrazine ($H_2N-NH_2$). Nitrile groups are converted into amidoxime groups via transformation with hydroxylamine. By contrast, the transformation with hydrazine leads to amidrazone groups, or a mixture of corresponding amide hydrazone tautomers. In this context, special preference is given to using polyacrylonitrile (PAN) which has been transformed with hydroxylamine. As has already been explained in the introduction, PAN-based gas diffusion layers in carbonized form are known for use as gas diffusion layers or microporous layers. Unlike in the prior art, however, the PAN is not carbonized in the present instance, since the nitrile groups are lost here, but rather are transformed with a suitable reagent in order to generate complexing functional groups.

An advantage of amidoxime groups as complexing functional groups is that they already exhibit good ionic conductivity, in particular for protons. In order to even further increase the ionic conductivity, in embodiments of the invention it is provided that the polyacrylonitrile is present in the form of a copolymer that, besides the acrylonitrile blocks, has at least one additional comonomer, or is present in the form of a blend with an additional organic polymer. The comonomer or the additional polymer is preferably a polymer which possesses ionic groups, whereby the ionic conductivity of the substrate is further increased. Acrylic acid is preferably used as a comonomer, or polyacrylic acid, which is present as a blend with the PAN, is used as an additional polymer. Via the introduction of acrylic acid groups into the substrate, this is furnished not only with a good ionic conductivity, but also with a good electrical conductivity, which is advantageous for the electrical connection of the catalytic centers to the adjacent (in the fuel cell) bipolar plate. Thus, in this embodiment the gas diffusion electrode has catalytically active centers with noble metal particles and in addition to these has acrylic acid groups responsible for the electrical conductivity.

In embodiments of the invention, the gas-permeable substrate is formed from fibers of the organic polymer. In particular, the substrate has the form of a non-woven material, felt, or fiber web. The advantage of this embodiment is that corresponding materials, for example PAN felts or fiber webs, are commercially available and inexpensive. PAN may thus be easily spun into fibers, and these may be processed further to form corresponding fiber structures. In addition, fiber materials have the necessary permanent integral stability required for gas diffusion electrodes.

The catalytic noble metal is one that is suitable for catalyzing the fuel cell reactions at the anode or cathode. In particular, elements of the platinum group are used here, preferably platinum and/or palladium.

The distribution of the catalytic noble metal particles and/or atoms within the gas-permeable substrate may be selected in a variable manner. According to one embodiment, the catalytic noble metal particles and/or atoms are present only within a relatively sharply defined surface-proximal region of the membrane-facing first flat side of the substrate. In an alternative embodiment of the invention, the catalytic noble metal particles and/or atoms are present with a concentration gradient decreasing inward from the direction of the first flat side of the substrate. In this way, the thermal and water economy of the fuel cell may be distributed uniformly. Furthermore, the catalytic activity may be concentrated where it is needed.

An embodiment of the invention furthermore relates to a method for producing a gas diffusion electrode, which method includes:

providing a gas-permeable substrate which is formed from an organic polymer, wherein the polymer has functional groups capable of complexing metal cations, charging the functional groups, which are present at a surface of a first flat side of the substrate and/or in a surface-proximal region of the first flat side of the substrate, with ions of a catalytically active noble metal under complexation thereof, and reducing the complexly bound noble metal ions to an oxidation state of zero.

The provision of the gas-permeable substrate comprising the functional groups takes place in particular by treating a substrate formed from the organic polymer with a suitable reagent which functionalizes the polymer, or chemically converts already present functional groups into groups capable of complexing metal cations. For example, a PAN substrate may be treated with hydroxylamine so that the nitrile groups of the PAN are converted into amidoxime groups.

The preceding statements accordingly apply to the organic polymer and the functional groups.

The charging of the functional groups with the ions of one of the catalytically active noble metals may advantageously take place by bringing the substrate into contact with a solution of a suitable salt of the noble metal, for example via immersion, insertion, spraying, or the like. This may in particular take place partially, so that only the region on the surface of the first flat side of the substrate (which faces toward the polymer electrolyte membrane in the fuel cell) and/or in a surface-proximal region of the first flat side of the substrate is charged with the noble metal.

The reduction of complexly bonded noble metal ions to the elemental noble metal may take place via treatment with a suitable reducing agent. Since noble metals are readily converted into the oxidation state of zero due to their electron structure, nearly any reducing agent may be used here as long as it does not attack the polymer material. Examples of suitable reducing agents include sulfites, thiosulfates, hydroquinone, benzaldehyde, hydrazine, and others, as well as mixtures of these.

The product of the reducing step is the elemental (uncharged) noble metal present in finely particulate and/or even atomic form on the organic polymer material, it being assumed that the noble metal atoms or particles continue to be present in complex form or in complex-like form, bound to the functional groups.

A further aspect of the present invention relates to a fuel cell comprising a polymer electrolyte membrane; gas diffusion electrodes arranged on both sides of the polymer electrolyte membrane, wherein the first flat sides of the gas diffusion electrodes that have the catalytic noble metal cations each contact the membrane; and bipolar plates adjoining the gas diffusion electrodes. It is to be understood that an embodiment of the invention likewise relates to a fuel cell stack having a plurality of such fuel cells.

In a particularly advantageous embodiment of the invention, a membrane made up of a polymer is used as the polymer electrolyte membrane, which polymer is formed on the same polymer basis as the substrate of the gas diffusion electrode. In this way, a high chemical affinity between the gas diffusion electrode and the membrane is achieved, and a good material connection to the membrane is achieved with low transition resistances for the protons. Insofar as the gas-permeable substrate is PAN-based, a polymer electrolyte membrane is advantageously used which is a polyacrylonitrile-based membrane, wherein either its nitrile groups are at least partially converted to amidoxime groups by treatment with hydroxylamine, or which is impregnated with polyarylene ether sulfone.

In a particularly advantageous embodiment of the invention, no further layer is present between the polymer electrolyte membrane and the gas diffusion electrodes adjoining thereto, in particular no microporous layer and no catalytic layer as are customary in the prior art. Such a fuel cell has a particularly simple structure and may be produced with smaller layer thicknesses, and thus small installation space.

A further aspect of the invention relates to a fuel cell system that has a fuel cell or a fuel cell stack according to the invention. In particular, the fuel cell system has an anode supply and a cathode supply with the corresponding peripheral components in addition to the fuel cell stack.

A further aspect of the invention relates to a vehicle that has a fuel cell system having a fuel cell or a fuel cell stack according to the invention. The vehicle is preferably an electric vehicle in which an electrical energy generated by the fuel cell system serves to supply an electric traction motor and/or a traction battery.

Features and aspects of the various embodiments of the invention mentioned in this application may be combined advantageously with one another unless stated otherwise in individual cases.

BRIEF DESCRIPTION OF THE SEVERAL VIEWS OF THE DRAWINGS

The invention is explained below in exemplary embodiments in reference to the respective drawings. The following is shown.

DETAILED DESCRIPTION

Figures 1, 2:
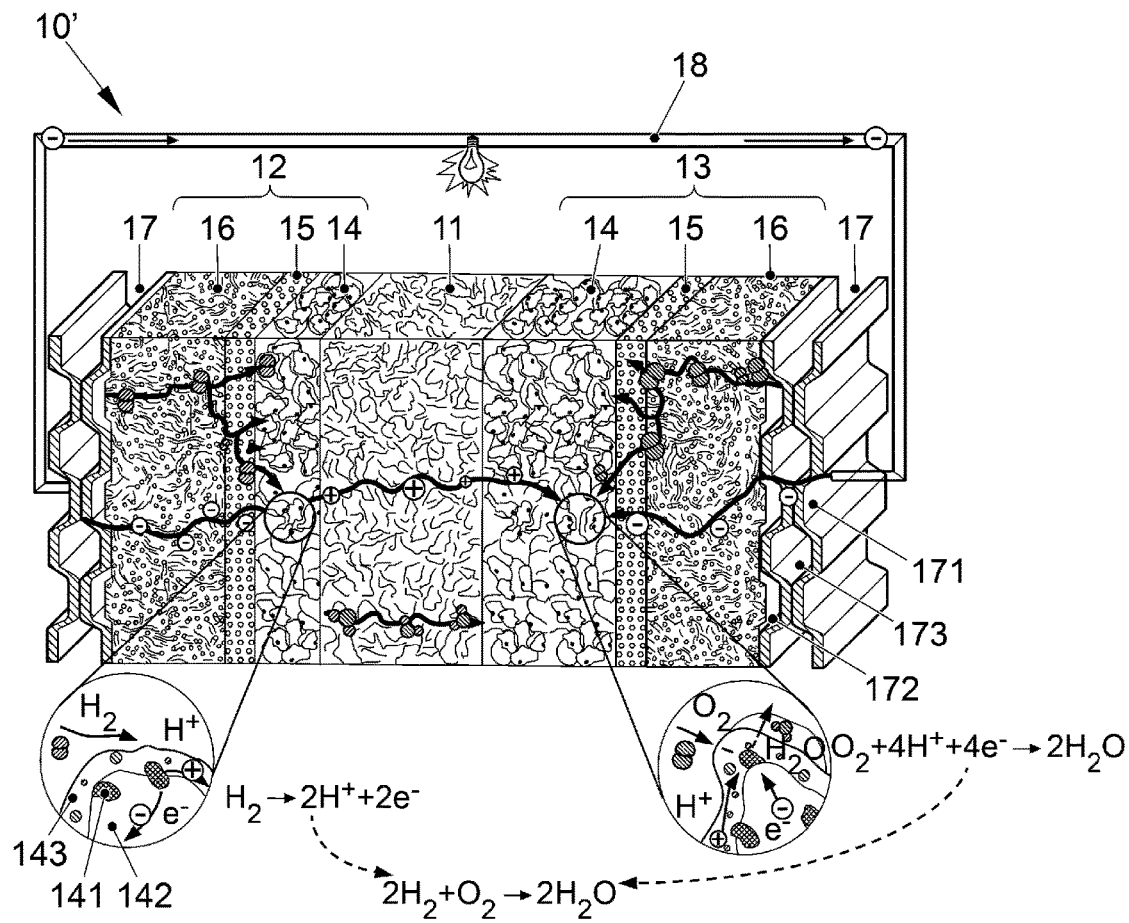
FIG. 1 a perspective section view of a fuel cell according to prior art, and the reactions taking place therein.
FIG. 2 the schematic sequence of components of a fuel cell according to the prior art.

FIG. 1 shows the structure and the occurring reactions of a fuel cell according to the prior art, designated as a whole with 10'.

The fuel cell 10' comprises a polymer electrolyte membrane 11 which exhibits an ionic conductivity, particularly for protons $H^+$. The most common material for polymer electrolyte membranes in fuel cells today is a sulfonated polytetrafluoroethylene (PTFE) known under the trademark Nafion®. One of each electrode structure, namely an anode 12 and a cathode 13, respectively adjoin each of the two sides of the membrane 11. Each of the electrodes 12, 13 comprises a catalytic layer 14, a gas diffusion layer 16, and optionally a microporous layer 15 arranged between gas diffusion layer 16 and catalytic layer 14.

The catalytic layers 14 typically have a supported catalytic material comprised of catalytic noble metal particles 141 which are present in fine distribution (see partial details in FIG. 1) on an electrically conductive substrate 142. The carrier material 142 of the particles is usually a carbon-based material such as activated carbon, carbon black, or the like. The catalyst material is held together by an ionically conductive polymeric binder 143 which is often selected from the same material as the polymer electrolyte membrane 11.

The gas diffusion layers 16 serve for the uniform supply of the reaction gases to the catalytic layers 14, and for the removal of the reaction products. The gas diffusion layers according to the prior art are comprised of an electrically conductive and gas-permeable layer in the form of foams or fibers. Carbon-based materials, such as expanded graphites, carbon fibers, or carbonized PAN, or hydrophilized organic polymer materials, are generally used. The microporous layers 15 are likewise comprised of an electrically conductive, usually carbon-based material, often carbon paper. The microporous layers 15 should prevent the penetration of the catalytic particles from the catalytic layer 14 into the gas diffusion layer 16. Insofar as the components catalytic layer 14, microporous layer 15, and gas diffusion layer 16 are present in a material composite, this composite is also referred to as a gas diffusion electrode GDE. Alternatively, it is known to apply the catalytic layers 14 directly onto the polymer electrolyte membrane 11, which is then referred to as a catalytically coated membrane or CCM.

A bipolar plate 17 adjoins each of the two sides of the gas diffusion layers 16. The bipolar plate has flow channels 171, 172 on each of its flat sides for supplying the reaction media and removing the fuel cell products. The anode-side flow channels 171 thereby serve to supply the fuel, mostly hydrogen $H_2$, as well as to discharge unreacted fuel and the product water. The cathode-side flow channels 172 serve to supply the oxygen, usually in the form of air, and to discharge the cathode exhaust gas and the product water. Furthermore, the bipolar plates 17 have internal coolant channels 173 which serve to conduct a coolant and dissipate the heat of reaction. The bipolar plates 17 are likewise made of an electrically conductive material, usually a metallic material or a graphite material. The bipolar plates 17 are connected via an external circuit 18 into which an electrical load is integrated.

The fuel cell 10' shows the following mode of operation. Hydrogen $H_2$ is supplied to anode 12 via the anode-side flow channels 171 of the bipolar plates 17. Air is supplied to cathode 13 via the cathode-side flow channels 172 of the bipolar plates 17. These operating gases diffuse through the respective gas diffusion layer 16 and the microporous layer 15 to the respective catalytic layer 14. At the anode-side catalytic layer 14, the hydrogen $H_2$ at the catalytic noble metal particles 141 is oxidized to protons $H^+$, wherein electrons $e^-$ are released which are discharged via the anode-side microporous layer 15 and gas diffusion layer 16, and the bipolar plate 17 adjoining thereto, via the circuit 18. The protons $H^+$ generated in the anode reaction migrate via the ionically conductive polymer electrolyte membrane 11 to the cathode 13 of the fuel cell. Here, the reaction of the oxygen $O_2$ of the supplied air takes place with the protons while taking up the electrons supplied via the circuit 18 to form water $H_2O$. In sum, hydrogen and oxygen thus react to form water, wherein the electromotive force of this reaction serves to generate electrical energy to supply an electrical load, for example an electric motor for an electrically powered motor vehicle. As a rule, a fuel cell comprises a plurality of individual cells according to FIG. 1 in serial connection.

FIG. 2 schematically shows the sequence of the components of a single fuel cell 10' according to the prior art, using the same reference numerals as in FIG. 1. It can be seen that the structure is comparatively complex, owing to the multitude of components.

Figure 3:
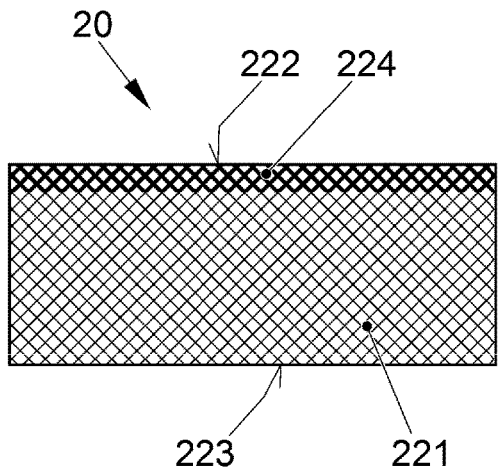
FIG. 3 a schematic section view of a gas diffusion electrode according to an embodiment of the invention, FIG. 4 a schematic section view of a gas diffusion electrode according to a further embodiment of the invention, FIG. 5 the schematic sequence of the components of a fuel cell according to the invention, with gas diffusion electrodes according to FIG. 3, and FIG. 6 the schematic sequence of the components of a fuel cell according to the invention, with gas diffusion electrodes according to FIG. 4.

FIG. 3 shows the structure of a gas diffusion electrode 20, designated as a whole with 20, for a fuel cell according to a first embodiment of the present invention.

The gas diffusion electrode 20 comprises a gas-permeable substrate 221 in the form of a flat structure that has a first flat side 222 and a second flat side 223 arranged opposite said first flat side 222. The substrate 221 is formed from an organic polymer which has functional groups that are covalently bonded to the backbone structure. The functional groups are suitable to chemically complex metal cations in the sense of a coordinative chemical bond. For this, it is required that the functional group possesses at least one free electron pair, preferably at least two free electron pairs.

Suitable functional groups of the polymer of the gas-permeable substrate 221 are selected from the group comprising primary amine groups (—$NH_2$); secondary amine groups (—NH—); tertiary amine groups (=N—); nitrosyl groups (—N=O); nitrile or cyanide groups (—CN); isocyanide groups (—NC), cyanate groups (—CNO); isocyanate groups (—NCO), carbonyl groups (—C=O); carboxyl groups (—C(O)OH); carboxylic acid ester groups (—C(O)OR); amide groups (—C(O)—$NH_2$); amidoxime groups (—C($NH_2$)=N—OH); hydroxamic acid groups (—CO—NHOH); amidrazone groups (—C(=NH)—NH—$NH_2$ including the tautomers —C($NH_2$)=N—$NH_2$ and —CH($NH_2$)—N=NH); and mixtures thereof. All of the preceding functional groups are characterized in that they have free electron pairs which are suitable for complex bonding, meaning that they are Lewis bases.

Amidoxime groups, amidrazone groups, and hydroxamic acid groups are particularly advantageous in the context of the present invention. The amidoxime group has two nitrogen atoms; the amidrazone group even has three nitrogen atoms, each having a free electron pair which are suitable for complexing a metal ion. The hydroxamic acid group has two free electron pairs which are provided by the carbonyl function and the amine group for coordinative bonding. It is thus in each case an at least bidentate ligand.

Modified polyacrylonitrile (PAN) represents a particularly advantageous polymer that may be used as the material for the substrate 221. Polyacrylonitrile is already, without subsequent reaction, furnished with nitrile groups (—CN) which as such are already capable of complexing metal cations. Moreover, nitrile groups may easily be chemically converted into other functional groups, in particular amidoxime groups, amidrazone groups, or hydroxamic acid groups. PAN is preferably used whose nitrile groups have, for example, been converted wholly or partly into hydroxime groups by reaction with hydroxylamine ($H_2N$—OH) (see reaction equation below). Polyacrylonitrile is additionally characterized by a high chemical resistance to acids and many organic solvents, as well as a high hydrolysis resistance.

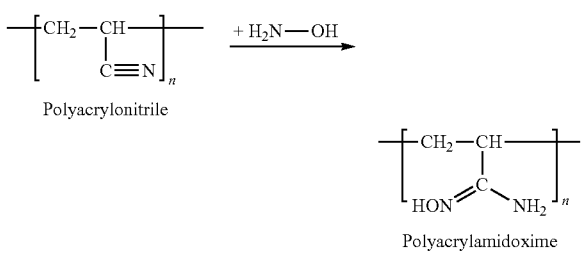

Polyacrylonitrile

Polyacrylamidoxime

Amidoxime groups have a particularly high affinity to copper ions, but may also bind platinum and palladium ions in a very stable manner. The following series shows the affinity of amidoxime to various metal ions: Cu>Au>V>U>Fe>Pd>Pt Zn>Cd>Cr>Ni>Pb.

In order to increase the ionic and electrical conductivity of the organic polymer of the gas-permeable substrate 221, it is preferably provided that the polymer additionally comprises acid groups. For this purpose, the organic polymer having the functional groups may be copolymerized with comonomers having corresponding acid groups. In particular, here a copolymer of acrylonitrile monomers and acrylic acid monomers whose nitrile groups are completely or partially converted into amidoxime groups may be used. Alternatively, a blend of polyacrylonitrile and polyacrylic acid may be used in which the nitrile groups of the polyacrylonitrile are converted into amidoxime groups before or after blending.

The substrate 221 must have a sufficient gas permeability. For this purpose, the substrate is preferably formed from fibers of the organic polymer that are present in the form of a non-woven material, felt, or fiber web.

According to FIG. 3, the gas diffusion electrode 20 according to the embodiment of the invention also has a catalytic segment 224 that is formed in the area of the first flat side 222 of the substrate 221, as well as in a region near the surface of the substrate. Within the catalytic segment 224, the gas diffusion electrode 20 has catalytic noble metal particles and/or noble metal atoms that have been formed by reducing the noble metal cations complexly bound by the functional groups of the organic polymer of the substrate 221. In particular, the noble metal particles or atoms are complexly bound by the functional groups of the substrate 221, preferably chelated by two or more functional groups. The catalytic noble metal particles or atoms are those which are suitable for catalyzing the fuel cell reactions, in particular those of the platinum group. The catalytic noble metal particles or atoms of the catalytic segment 224 particularly preferably comprise platinum and/or palladium. Furthermore, the gas diffusion electrode 20 according to the embodiment of the invention differs from the prior art in that the catalytic function is developed within the gas-permeable substrate 221, i.e., the gas diffusion layer, and is not present in the form of a coating on this. The gas diffusion electrode 20 according to the embodiment of the invention thus does not have the structure of a fabric or a composite of two layers, but rather is an integral component which combines the functions of the gas diffusion layer and the catalytic layer.

Figure 4:
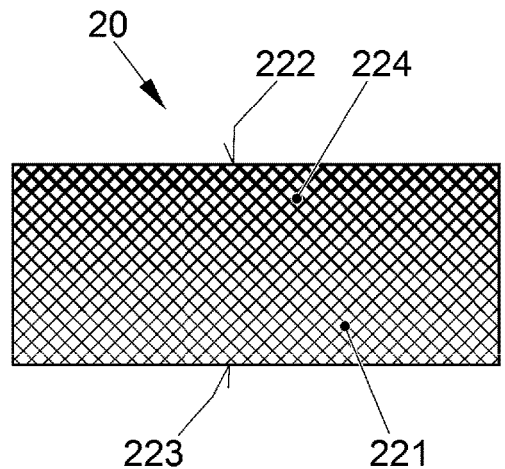

FIG. 4 shows a gas diffusion electrode 20 according to a second embodiment of the invention. Unlike the electrode shown in FIG. 3, here the catalytic noble metal particles/atoms are not limited to a relatively sharply and closely defined segment of the substrate 221. Instead, the concentration of noble metal exhibits a gradient decreasing from the first flat side 222 toward the interior of the substrate.

Figure 5:
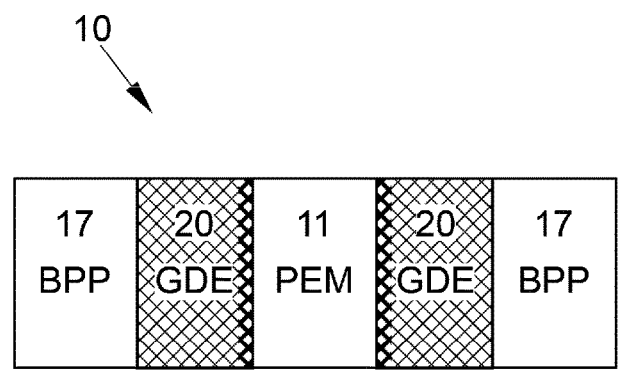

In a highly schematic representation, FIG. 5 shows the structure of a fuel cell 10 according to an embodiment of the invention with gas diffusion electrodes 20 according to FIG. 3. The fuel cell has a polymer electrolyte membrane 11 that is arranged between two gas diffusion electrodes 20 according to the invention. The gas diffusion electrodes 20 are arranged in such a way that each of their first flat sides 222, which are charged with the catalytic noble metal, respectively face toward the membrane 11 and contact it directly. One bipolar plate 17 each respectively adjoins each of the respective second flat sides 223 of the gas diffusion electrodes 20. It can be seen that the fuel cell 10 according to the embodiment of the invention has a simple structure made up of a few components. Thus, the gas diffusion electrode 20 replaces the catalytic layer 14, the microporous layer 15, and the gas diffusion layer 16 of conventional fuel cells (see FIG. 2).

Figure 6:
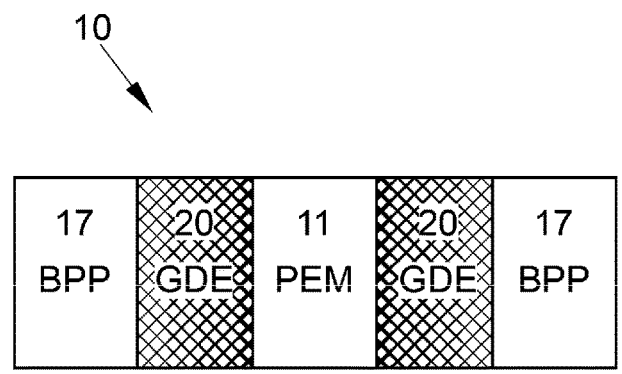

FIG. 6 shows a fuel cell 10 according to an embodiment of the invention, containing gas diffusion electrodes 20 according to FIG. 4.

In the fuel cell 10 according to the embodiment of the invention, a polymer electrolyte membrane 11 is preferably used which is based on the same or a similar polymer base as the substrate of the gas diffusion electrode 20. Insofar as the GDE 20 according to the embodiment is based on modified polyacrylonitrile, a polyacrylonitrile impregnated with poly(arylene ether sulfone) is preferably used, or polyacrylonitrile whose nitrile groups are entirely or partially converted into amidoxime groups. In both instances, a correspondingly treated PAN nonwoven material may be used as a basis of the membrane 11.

The mode of operation of the fuel cell 10 according to embodiments of the invention corresponds to what is described in connection with FIG. 1.

The gas diffusion electrode 20 according to an embodiment of the invention may be manufactured as follows. A felt is used which is formed from fibers of a copolymer of acrylonitrile (AN) and acrylic acid (AA), thus poly(acrylonitrile-co-acrylic acid), or from a blend made up of polyacrylonitrile (PAN) and polyacrylic acid (PAA). For example, the felt is transformed with hydroxylamine, wherein the nitrile groups react to form amidoxime groups. After cleaning and drying of the felt treated in such a manner, the first flat side of the felt is charged with a suitable platinum salt solution (for example aqueous platinum (II) chloride solution). This may be done in that the noble metal salt solution is sprayed onto the first flat side 222, or in that the felt is immersed with its first flat side 222 in the noble metal solution, wherein only the first flat side 222 or the region near the surface thereof is dipped into the solution. Due to the high affinity of the amidoxime groups, a rapid complexing of the noble metal cations occurs here in the form of a chelation. Insofar as a structure with a concentration gradient of the catalytic noble metal according to FIG. 4 is to be produced, the immersion time in the noble metal salt solution may be selected to be correspondingly long so that a suction of the solution in the direction of the interior of the substrate 221 occurs as a result of capillary forces. The felt is subsequently rinsed and dried. The noble metal cations located on the substrate 221 are then converted into noble metal particles with an oxidation state of zero via application of a reducing agent, for example hydroquinone.

The assembly of the fuel cell 10 then takes place in that the polymer electrolyte membrane 11 is arranged between two gas diffusion electrodes 20 produced in the manner described above, wherein each of the first flat sides charged with the catalytic noble metal are respectively arranged on the membrane. This structure of membrane 11 and gas diffusion electrodes 20 is alternately stacked with bipolar plates 17 to form a fuel cell stack, and is compacted via external tensioning means or devices.

Exemplary Embodiment

For the following preparation, a protocol analogous to Duk Man Yu et al. was used ("Properties of sulfonated poly(arylene ether sulfone)/electrospun nonwoven polyacrylonitrile composite membrane fro [sic] proton exchange membrane fuel cells" J. Membrane Sci. 446 (2013), 212-219).

1. Amidoxime Functionalization of PAN Felt (PAN-Oxime)

32 g of hydroxylammonium chloride ($ClH_4NO$) were dissolved with stirring in 800 ml of demineralized water at 80° C. (see Table 1). 18 felt pieces PAN (Heimbach Company, Type 876531 5/5 PAN (H) 500 g/m² of felt) of size 2 cm×2 cm and with a thickness of 2.6 mm were then added into the solution. Sodium bicarbonate ($NaHCO_3$) was subsequently added in portions until the $CO_2$ development had concluded (approximately 1 h 10 min) and a complete conversion of hydroxylammonium chloride with sodium bicarbonate to form hydroxylamine was to be assumed:

$$NaHCO_3 + HONH_3Cl \rightarrow CO_2 + H_2O + H_2N\text{-}OH + NaCl$$

The preparation was stirred for a further 3 h at 80° C., wherein after 1 h, 2 h, and 3 h, respectively, 6 felt pieces were removed from the reaction solution and transferred for washing into 250 ml of demineralized water at room temperature and with stirring. The felts floated at the top of the wash water. The washing process was repeated 3 times for 10 minutes each.

The felts had a light yellow color after 1 h; a light yellow color after 2 h; and a honey yellow color after 3 h.

TABLE 1

Conversion of PAN with the hydroxylammonium chloride solution

| Felt samples | Area (cm$^2$) | ClH$_4$NO solution (mol/l) | ClH$_4$NO (g) | NaHCO$_3$ (g) | Reaction time at 80° C. (h) | Color |
|---|---|---|---|---|---|---|
| 019-024 | 24 | 0.58 | 32 | 51.6 | 1 | light yellow |
| 025-030 | 24 | 0.58 | 32 | 51.6 | 2 | yellow |
| 031-036 | 24 | 0.58 | 32 | 51.6 | 3 | honey yellow |

2. Complexing of $Fe^{3+}$ with PAN-Oxime 200 ml of a $7.5 \cdot 10^{-4}$ mol/l FeCl$_3$ solution which were already dark yellow/orange were used in each case. The PAN-oxime felts from Example 1 were then added and stirred for 20 min at room temperature. The felts discolored orange-light brown. The felt pieces were subsequently removed from the solutions and washed in demineralized water.

TABLE 2

Pretreatment of PAN-oxime felts with FeCl$_3$

| Felt samples | FeCl$_3$ solution (mol/l) | Reaction time of conversion with hydroxylamine (h) |
|---|---|---|
| 019-021 | 7.5 · 10−4 mol/l | 1 |
| 025-027 | 7.5 · 10−4 mol/l | 2 |
| 031-033 | 7.5 · 10−4 mol/l | 3 |

3. Complexing of $Pt^{2+}$ with PAN-Oxime

The FeCl$_3$-treated PAN felts from Example 2 were washed with concentrated hydrochloric acid (HCl), wherein they decolored. A saturated solution of PtCl$_2$ in concentrated HCl (sediment) was prepared, and the saturated supernatant was decanted. 3 of the FeCl$_3$-pretreated and HCl-washed felts, as well as 3 untreated with FeCl$_3$, in each case were shaken with 10-15 ml of the saturated PtCl$_2$ solution for 24 h at room temperature. After 24 h, the PtCl$_2$ solution was decanted, and the felts were washed with dilute hydrochloric acid for 30 min and subsequently washed 2 times with demineralized water.

4. Reduction of the $Pt^{2+}$ Complexed with PAN-Oxime, with Various Reducing Agents The felts from Example 3 were placed for 60 min in a solution of a reducing agent (sodium thiosulfate, sodium sulfite, or hydroquinone) according to Table 3 and shaken, and subsequently were washed with 10-15 ml of demineralized water. The preparations with Na$_2$S$_2$O$_3$ 5 H$_2$O were cloudy. The felts were dried in air at room temperature. The felts treated with Na$_2$S$_2$O$_3$ 5 H$_2$O showed a honey yellow to brownish coloration; the felts treated with Na$_2$S$_2$O$_3$ showed a light yellow coloration; and the felts treated with hydroquinone showed a light yellow to pale brownish coloration. The colorations of the felts showed no dependency upon a pretreatment with FeCl$_3$ taking place or not taking place, or upon the duration of the conversion with hydroxylamine.

TABLE 3

Reducing the $Pt^{2+}$ to $Pt^0$ with different reducing agents

| Felt sample | Reducing agent $3.44 \cdot 10^{-1}$ mol/l | Pretreatment FeCl$_3$ solution | Reaction time of conversion with hydroxylamine (h) |
|---|---|---|---|
| 019 | Na$_2$S$_2$O$_3$ | yes | 1 |
| 020 | Na$_2$S$_2$O$_3$•5H$_2$O | yes | 1 |
| 021 | hydroquinone | yes | 1 |
| 022 | Na$_2$S$_2$O$_3$ | no | 1 |
| 023 | Na$_2$S$_2$O$_3$•5H$_2$O | no | 1 |
| 024 | hydroquinone | no | 1 |
| 025 | Na$_2$S$_2$O$_3$ | yes | 2 |
| 026 | Na$_2$S$_2$O$_3$•5H$_2$O | yes | 2 |
| 027 | hydroquinone | yes | 2 |
| 028 | Na$_2$S$_2$O$_3$ | no | 2 |
| 029 | Na$_2$S$_2$O$_3$•5H$_2$O | no | 2 |
| 030 | hydroquinone | no | 2 |
| 031 | Na$_2$S$_2$O$_3$ | yes | 3 |
| 032 | Na$_2$S$_2$O$_3$•5H$_2$O | yes | 3 |
| 033 | hydroquinone | yes | 3 |
| 034 | Na$_2$S$_2$O$_3$ | no | 3 |
| 035 | Na$_2$S$_2$O$_3$•5H$_2$O | no | 3 |
| 036 | hydroquinone | no | 3 |

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:
1. A gas diffusion electrode for a fuel cell, comprising:
a gas-permeable substrate which is formed from an organic polymer having an organic polymer backbone, wherein the polymer has functional groups covalently bonded to the organic polymer backbone and capable of complexing metal cations; and
catalytically active noble metal particles and/or atoms that are bonded, by the functional groups, to a surface of a first flat side of the substrate and/or in a surface-proximal region of the first flat side of the substrate.

2. The gas diffusion electrode according to claim 1, wherein the functional groups comprise amidoxime groups, hydroxamic acid groups, amidrazone groups, or mixtures thereof.

3. The gas diffusion electrode according to claim 1, wherein the organic polymer is a nitrile-group-containing polymer whose nitrile groups are partially or entirely converted into amidoxime groups, hydroxamic acid groups, and/or amidrazone groups.

4. The gas diffusion electrode according to claim 1, wherein the organic polymer is a hydroxylamine-transformed copolymer of acrylonitrile and acrylic acid monomers, or a blend of hydroxylamine-transformed polyacrylonitrile and polyacrylic acid.

5. The gas diffusion electrode according to claim 1, wherein the gas-permeable substrate is formed from fibers of the organic polymer.

6. The gas diffusion electrode according to claim 1, wherein a concentration of the catalytically active noble metal particles and/or atoms decreases inward with a gradient from the direction of the first flat side of the substrate.

7. A method for producing a gas diffusion electrode for a fuel cell, comprising:
providing a gas-permeable substrate which is formed from an organic polymer having an organic polymer backbone, wherein the polymer has functional groups covalently bonded to the organic polymer backbone and capable of complexing metal cations;
charging the functional groups, which are present at a surface of a first flat side of the substrate and/or in a surface-proximal region of the first flat side of the substrate, with ions of a catalytically active noble metal under complexation thereof; and
reducing the complexly bound noble metal ions to an oxidation state of zero.

8. A fuel cell, comprising:
a polymer electrolyte membrane;
gas diffusion electrodes arranged on both sides of the polymer electrolyte membrane,
wherein each gas diffusion electrode comprises a gas-permeable substrate which is formed from an organic polymer having an organic polymer backbone, wherein the polymer has functional groups covalently bonded to the organic polymer backbone and capable of complexing metal cations, and further comprises catalytically active noble metal particles and/or atoms that are bonded, by the functional groups, to a surface of a first flat side of the substrate and/or in a surface-proximal region of the first flat side of the substrate, and
wherein each of the first flat sides of the gas diffusion electrodes which have the catalytically active noble metal particles and/or atoms respectively contact the polymer electrolyte membrane; and
bipolar plates adjoining the gas diffusion electrodes.

9. The fuel cell according to claim 8, wherein the polymer electrolyte membrane is a polyacrylonitrile-based membrane whose nitrile groups are at least partially converted into amidoxime groups, or which is impregnated with polyarylene ether sulfone.

10. The fuel cell according to claim 8, wherein no additional layer is present between the polymer electrolyte membrane and the gas diffusion electrodes adjoining thereto.

11. The gas diffusion electrode according to claim 3, wherein the organic polymer comprises polyacrylonitrile (PAN) transformed with hydroxylamine and/or hydrazine, or a copolymer or a blend thereof.

12. The gas diffusion electrode according to claim 5, wherein the fibers of the organic polymer are in the form of a fleece, a felt, or a fiber web.

13. The gas diffusion electrode according to claim 8, wherein no microporous layer and no catalytic layer is present between the polymer electrolyte membrane and the gas diffusion electrodes adjoining thereto.

* * * * *